June 17, 1930.     H. J. CALDWELL     1,763,645
GEARING
Original Filed Oct. 17, 1921

Inventor:
Harry J. Caldwell
By Wilson & McCanna
Attys.

Patented June 17, 1930

1,763,645

UNITED STATES PATENT OFFICE

HARRY J. CALDWELL, OF ROCKFORD, ILLINOIS, ASSIGNOR TO THE INGERSOLL MILLING MACHINE COMPANY, OF ROCKFORD, ILLINOIS, A CORPORATION OF ILLINOIS

GEARING

Original application filed October 17, 1921, Serial No. 508,374. Divided and this application filed December 31, 1925. Serial No. 78,515.

This invention relates to gearing generally and more particularly change-speed and reverse gearing adapted for feeding and traversing the table in a reciprocating type milling machine.

The principal object of the invention is to provide a simple, compact, and economical gearing mechanism for the purpose mentioned enabling the transmission of power forward and reverse to a driven shaft at a relatively low speed for feed purposes and at a relatively high speed for traverse purposes, the change from one speed to another or from one direction to another being controlled by the operation of two clutches which when shifted simultaneously effect a change in speed in the same direction and which when shifted separately effect a change in direction or a change in both speed and direction.

The present application is a division of my application Serial No. 508,374 filed October 17, 1921, which eventuated in Patent 1,599,204, September 4, 1926.

The invention is more fully described in the following specification in which reference is made to the accompanying drawing, wherein—

Figure 1:
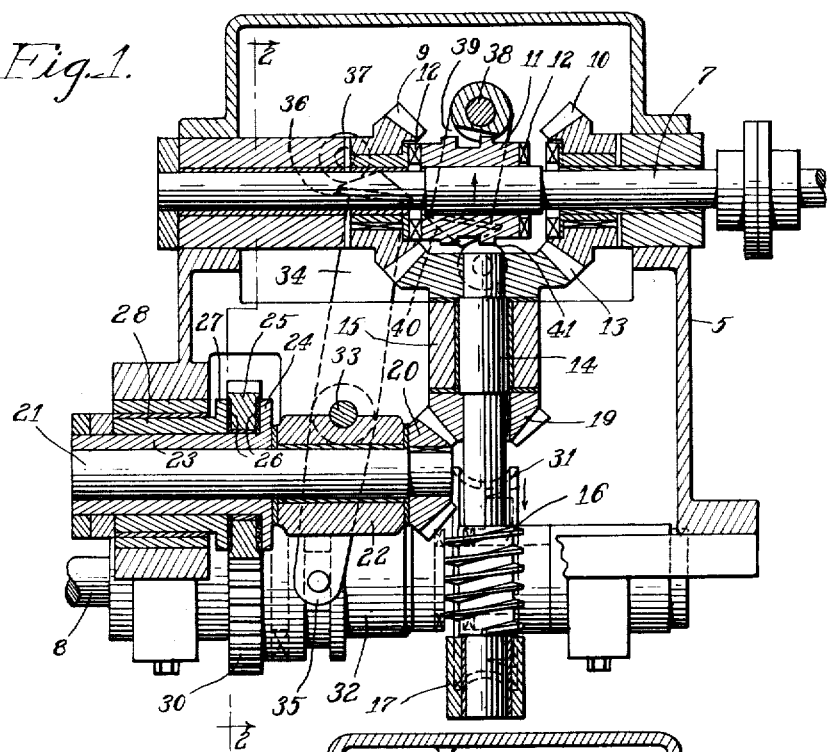
Figure 2:
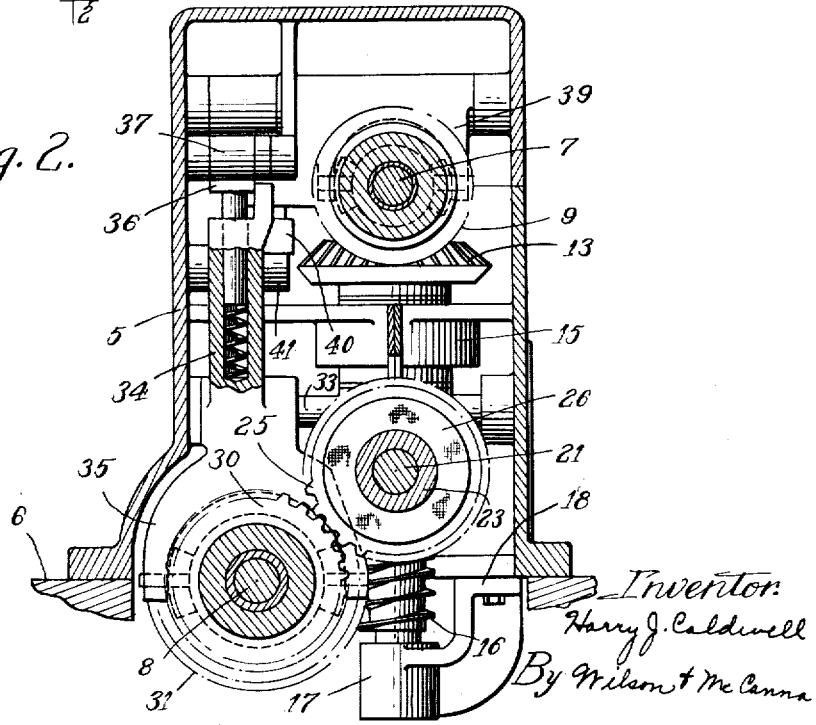

Figure 1 is a horizontal section through a casing containing my improved gearing; and Fig. 2 is a cross-section taken substantially on the line 2—2 of Fig. 1 looking in the direction of the arrows.

The invention is illustrated as arranged for application to a reciprocating type milling machine, that is, one in which the work is carried on a table moving back and forth past the cutting tool or tools. The gearing is arranged for feeding the work table or the equivalent thereof back and forth at relatively fast and slow speeds during each stroke and preferably in a continuous cycle including rapid traverse and feed movements in both directions. It should, however, be understood that the present improvements are capable of a wide variety of applications wherever power transmission in the manner herein contemplated may find application, on machine tools or otherwise.

The gearing is illustrated as housed within a casing 5 adapted for mounting on the side of the bed 6 adjacent one end of the latter preferably, for convenient connection with the screw operating in a nut on the table moving in ways on the bed 6, as described in my application above referred to. It will be seen that the gear box or casing 5 with its enclosed gearing and clutches constitutes a unit assembly adapted for application to different machines of the character referred to and at different positions thereon. A driving shaft 7 and a driven shaft 8 journaled in the gear box 5 are connected by intermediate gearing for the transmission of power from the shaft 7 to the shaft 8 at two speeds forward and reverse, as will presently appear. Any suitable means such, for example, as a belt driven pulley arranged for connection with the shaft 7 through the agency of a clutch to be shifted at the will of the operator may be provided for driving the shaft 7. The driven shaft 8 on the other hand may be connected directly or through the agency of suitable change speed or reduction gearing with the feed screw of the reciprocating table previously referred to. In operation, the driving shaft 7 revolves continuously in one direction and through the agency of the gearing and clutches between it and the shaft 8 the latter will be driven in opposite directions and at different speeds for correspondingly propelling the work table.

The shaft 7 carries a pair of opposed bevel gears 9 and 10 loosely thereon, having an intermediate clutch element 11 splined on the shaft and adapted to be shifted in either direction for connecting its clutch teeth 12 with the complemental teeth on either of the bevel gears 9 or 10. An intermediate bevel gear 13 meshes with both of the gears 9 and 10 and is fixed to a transverse worm shaft 14 journaled in a bearing 15 within the gear box 5. The worm shaft has a worm screw 16 fixed thereon adjacent an end bearing 17 provided in a bracket 18 extending from the gear box. A bevel gear 19 is also fixed on the shaft 14 and meshes with a bevel gear 20 fixed to an intermediate shaft 21 mounted in a bearing 22 within the gear box 5. The shaft 21 has a sleeve 23 turning therewith provided with a flange 24 to engage one side of a spur gear 25 with a friction element 26 interposed. A flange 27 on another sleeve 28 engages the opposite side of the spur gear 25 with another friction element 26 interposed. The arrangement provides a frictional drive connection between the shaft 21 and the spur gear 25 whereby sudden shocks or strains incidental to sudden reversing or changes in speed are absorbed and not communicated to the gearing. The spur gear 25 meshes with a spur gear 30 loose on the driven shaft 8. A worm gear 31 also loose on the driven shaft meshes with the worm screw 16 fixed on the shaft 14. A clutch element 32 splined on the driven shaft 8 is adapted to be shifted in opposite directions to engage the clutch teeth at its ends with complemental teeth on the gears 30 and 31.

A rock shaft 33 carries a lever 34 within the gear box, one end 35 of which is forked and in operative connection with the clutch element 32 for shifting the latter, and the opposite end of which carries a spring pressed plunger 36 having a pointed head the faces of which are adapted to cooperate with a stationary roller 37 for holding the clutch 32 yieldingly in either of the positions to which the same may be shifted. Another rock shaft 38 has a forked arm 39 operatively engaging the clutch element 11 for shifting the latter and likewise has a spring pressed plunger 40 the faces of which are adapted to engage another stationary roller 41 for the purpose of holding the clutch 11 yieldingly in either engaged position. Since the means for operating the clutch shifting levers forms no part of the present invention but is fully described in my application above mentioned, it will suffice to state that the movements thereof may be produced by the dogs mounted on the table of the machine to actuate the proper clutches at the proper predetermined times.

From the foregoing description, it will be evident that when the driving shaft 7 is rotated in a clockwise direction viewing the right hand side of Fig. 1 with the clutches engaged in the manner shown, the shaft 8 will be driven in the same direction through the agency of gears 9, 13, 19, 20, 25, and 30 at a speed corresponding to the rapid traverse movement of the work table. The worm gear 31 will, however, be revolved in the opposite direction through the agency of the worm screw 16 and, of course, at a reduced speed. If the clutch element 11 is shifted to connect the gear 10 to the driving shaft without shifting the clutch 32, the rapid traverse drive will obviously be reversed. The shifting of the clutch 32 to the opposite position connects the worm gear 31 with the shaft 8 and the latter is driven at a slow feed speed in a counter-clockwise direction because of the fact that the worm wheel 31, as previously stated, turns in the opposite direction from the gear 30. If, however, both of the clutches 11 and 32 are simultaneously shifted to the right from the positions shown the worm wheel 31 will be turned clockwise, and the shaft 8 will be driven in the same direction as it was previously driven by the gear 30 but, of course, at a reduced speed. The clutch shifting means, as described in my application above mentioned, provides for the simultaneous or separate shifting of the clutches to produce the operations referred to.

It is believed that the foregoing description conveys a clear understanding of the invention and of its purposes and advantages so that anyone skilled in the art to which the invention relates will appreciate the possible applications thereof.

I claim:

1. A gearing mechanism of the character described adapted for use with a reciprocating type machine tool, comprising a driven shaft, a driving worm shaft, an intermediate shaft having a bevel gear fixed thereon, a second bevel gear meshing therewith and fixed to the worm shaft, a spur gear fixed on said intermediate shaft, a second spur gear meshing therewith and loose on the driven shaft, a worm gear loose on the driven shaft, a worm screw on said worm shaft meshing with said worm gear, a clutch element splined on the driven shaft and adapted for connecting either the loose spur gear or loose worm gear thereto, and means for shifting said clutch element.

2. A gearing mechanism of the character described adapted for use with a reciprocating type machine tool, comprising a driven shaft, a driving worm shaft, an intermediate shaft having a bevel gear fixed thereon, a second bevel gear meshing therewith and fixed to the worm shaft, a spur gear fixed on said intermediate shaft, a second spur gear meshing therewith and loose on the driven shaft, a worm gear loose on the driven shaft, a worm screw on said worm shaft meshing with said worm gear for revolving the same in the opposite direction from said loose spur gear and at a slower speed, a clutch element splined on the driven shaft and adapted for connecting either the loose spur gear or loose gear thereto, and means for shifting said clutch element.

3. A gearing mechanism of the character described adapted for use with a reciprocating type machine tool, comprising a driven shaft, a driving worm shaft, an intermediate shaft having a bevel gear fixed thereon, a second bevel gear meshing therewith and fixed to the worm shaft, a spur gear fixed on said intermediate shaft, a second spur gear meshing therewith and loose on the driven shaft, said spur gear on said intermediate shaft having a friction drive connection therewith, a worm gear loose on the driven shaft, a worm screw on said worm shaft meshing with said worm gear for revolving the same in the opposite direction from the loose spur gear and at a slower speed, a clutch element splined on the driven shaft and adapted for connecting either the loose spur gear or loose worm gear thereto, and means for shifting said clutch element.

In witness of the foregoing I affix my signature.

HARRY J. CALDWELL.

CERTIFICATE OF CORRECTION.

Patent No. 1,763,645.            Granted June 17, 1930, to

HARRY J. CALDWELL.

It is hereby certified that error appears in the printed specification of the above numbered patent requiring correction as follows: Page 2, line 116, claim 2, after the word "loose" insert the word "worm"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.

worm shaft meshing with said worm gear for revolving the same in the opposite direction from the loose spur gear and at a slower speed, a clutch element splined on the driven shaft and adapted for connecting either the loose spur gear or loose worm gear thereto, and means for shifting said clutch element.

In witness of the foregoing I affix my signature.

HARRY J. CALDWELL.

CERTIFICATE OF CORRECTION.

Patent No. 1,763,645.   Granted June 17, 1930, to

HARRY J. CALDWELL.

It is hereby certified that error appears in the printed specification of the above numbered patent requiring correction as follows: Page 2, line 116, claim 2, after the word "loose" insert the word "worm"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.